United States Patent
Haerr et al.

(10) Patent No.: US 6,209,442 B1
(45) Date of Patent: Apr. 3, 2001

(54) BRAKE BOOSTER WITH COMPRESSIBLE AIR VALVE FOR BRAKING SPEED OF APPLICATION ENHANCEMENT

(75) Inventors: Timothy Allen Haerr, Enon; James William Zehnder, II, Huber Heights; Gary Chris Fulks, Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/374,665

(22) Filed: Aug. 16, 1999

(51) Int. Cl.$^7$ ...................................................... F15B 9/10
(52) U.S. Cl. ............................................................ 91/377
(58) Field of Search ............................... 91/372, 373, 374, 91/376 R, 377, 378, 369.1, 369.2, 369.4

(56) References Cited

U.S. PATENT DOCUMENTS

| | | | |
|---|---|---|---|
| 3,049,099 | * 8/1962 | Price | 91/373 |
| 3,109,282 | * 11/1963 | Price | 91/369.2 |
| 3,110,031 | * 11/1963 | Price | 91/369.2 X |
| 3,143,927 | * 8/1964 | French et al. | 91/376 R |
| 3,279,327 | * 10/1966 | French | 91/369.2 |
| 4,729,285 | * 3/1988 | Harrison | 91/369.2 |
| 5,040,450 | * 8/1991 | Jakobi | 91/376 R |
| 5,884,548 | 3/1999 | Ando et al. | |

FOREIGN PATENT DOCUMENTS

| | | | |
|---|---|---|---|
| 1550970 | * 7/1969 | (DE) | 91/376 R |
| 2152610 | * 8/1985 | (GB) | 91/376 R |

* cited by examiner

Primary Examiner—John E. Ryznic
(74) Attorney, Agent, or Firm—Robert M. Sigler

(57) ABSTRACT

A vacuum brake booster provides a braking speed of application enhancement by increasing the air valve opening when a vehicle operator applies braking force quickly and forcefully. This is accomplished with a two part air valve which is normally expanded axially to a normal length by an internal spring but which may be shortened to open the air valve by a greater amount when the brake pedal input force is sufficient to move the air valve axially against another spring into contact with a shoulder of the power piston. The internal spring has a much higher preload than the other spring so that the booster operates with a fully axially expanded air valve in normal, low force brake activation. Once the air valve axially engages the power piston, however, the increase in air valve opening is immediate and substantial with any further increase in braking force. The air valve has an air valve input element having a pin projecting radially outward into an opening in a side wall of an air valve output element surrounding the air valve input element so as to axially engage a side of the opening to limit expansion of the air valve by the spring and thus define the normal axial length of the air valve.

3 Claims, 2 Drawing Sheets

BRAKE BOOSTER WITH COMPRESSIBLE AIR VALVE FOR BRAKING SPEED OF APPLICATION ENHANCEMENT

TECHNICAL FIELD

The technical field of this invention is differential brake boosters for vehicles.

BACKGROUND OF THE INVENTION

Power brake boosters of the differential pressure type using engine vacuum are well known in the motor vehicle industry. A brake booster of this type has a diaphragm separating a vacuum chamber open to a source of vacuum, such as created in an engine intake passage, and a working chamber normally provided with vacuum or atmospheric air by a valve apparatus responsive to input brake pedal actuation to provide brake assist force as required through a power piston fixed to the diaphragm and coupled to the booster output.

The valve apparatus may have a vacuum valve seat on the power piston that is engageable with a floating control valve as well as an air valve that also has a seat engageable with the same side of the floating control valve and is coupled to a brake input rod. In the rest position (no brake apply) the air valve is engaged with the floating control valve, and the vacuum valve is slightly separated therefrom to guarantee vacuum on both sides of the diaphragm and thus no brake boost assist. A brake input to the air valve moves the air valve seat axially past the vacuum valve seat, whereupon the floating control valve moves against the vacuum valve seat to shut off the flow of vacuum into the working chamber and allow the air valve seat to disengage and admit air at atmospheric pressure into the working chamber. The increase in air pressure in the working chamber produces a differential pressure across the diaphragm to move it axially; and the power piston move with it to provide an assist force to the brake fluid in the master cylinder. Movement of the power piston allows the floating control valve to move toward the air valve seat; and the level of boost assist is thus matched to the driver's input force. The opening of the air valve is calibrated to provide smooth brake apply in normal and typical driving situations.

Occasionally a driver may wish or need to stop the vehicle as quickly as possible. In such a situation, it might be possible to provide slightly quicker brake application by admitting air to the working chamber of the brake booster at a faster rate. But this faster air admittance should not be provided except in such situations, since it would not produce appropriate braking behavior in normal driving.

SUMMARY OF THE INVENTION

The apparatus of this invention provides a braking speed of application enhancement by increasing the air valve opening in a vacuum brake booster when a vehicle operator applies braking force quickly and forcefully. This is accomplished with a two part air valve which is normally expanded axially to a normal length by an internal spring but which may be shortened to open the air valve by a greater amount when the brake pedal input force is sufficient to move the air valve axially against another spring into contact with a shoulder of the power piston. The internal spring has a much higher preload than the other spring so that the booster operates with a fully axially expanded air valve in normal, low force brake activation. Once the air valve axially engages the power piston, however, the increase in air valve opening is immediate and substantial with any further increase in braking force. The air valve has an air valve input element having a pin projecting radially outward into an opening in a side wall of an air valve output element surrounding the air valve input element so as to axially engage a side of the opening to limit expansion of the air valve by the spring and thus define the normal axial length of the air valve.

DESCRIPTION OF THE PREFERRED EMBODIMENT

Figure 1:
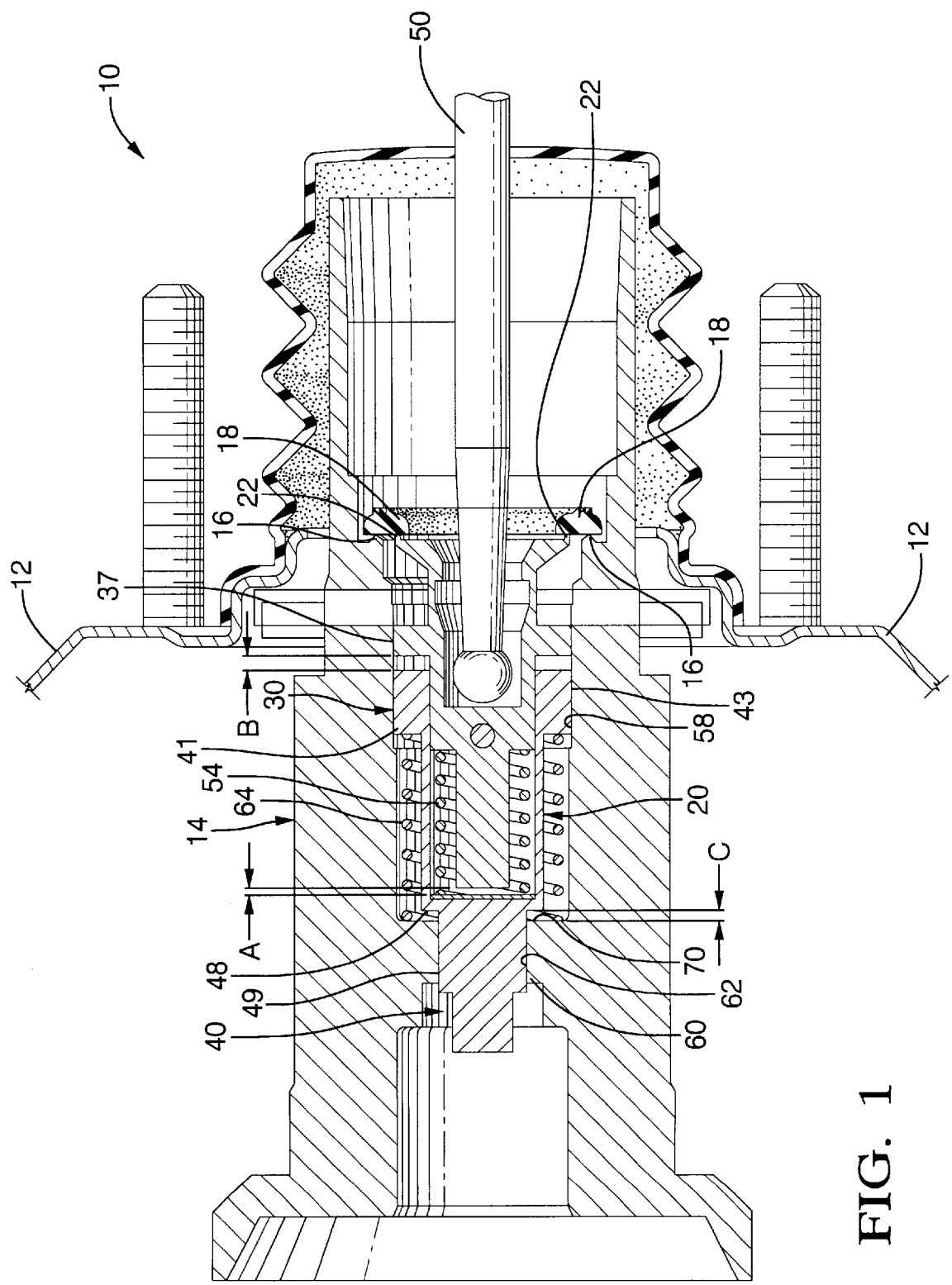
FIG. 1 is an axial cutaway view of a portion of a brake booster according to this invention showing the air valve arrangement which differs from that in a standard brake booster.

FIG. 1 shows a portion of a brake booster containing the elements of this invention. Booster 10 has an outer case, a small portion of which is shown at 12. The case defines in the standard manner, with the aid of one or more diaphragms and other members not shown, at least one vacuum chamber on the output side of the diaphragm provided with vehicle engine induction vacuum and at least one working chamber on the input side of the diaphragm. FIG. 1 shows a power piston 14, which is attached to the diaphragm in a standard manner not shown, for movement therewith to provide the output boost assist force. Power piston 14 defines an annular vacuum valve seat 16 of normal construction which is shown engaged with an annular floating control valve 18, only portions of which are shown but which is also of standard construction. Although not specifically shown in FIG. 1, vacuum is available in the normal manner radially outside vacuum valve seat 16 and is admitted therefrom to the working chamber when vacuum valve seat 16 disengages from floating control valve 18.

An air valve 20 is also provided in booster 10; and air valve 20 has at its input end (the rightmost end thereof in FIG. 1) an annular air valve seat 22 which is shown engaged with floating control valve 18. Although not specifically shown, air at atmospheric pressure is available in the normal manner through the right end 15 of power piston 14 to the region radially inside air valve seat 22 and is admitted therefrom to the working chamber when air valve seat 22 disengages from floating control valve 18. Although not shown, spring means are provided in the standard manner to bias floating control valve 18 to the left in FIG. 1 against whichever of air valve seat 22 or vacuum valve seat 16 is closest (furthest to the right).

Figure 2:
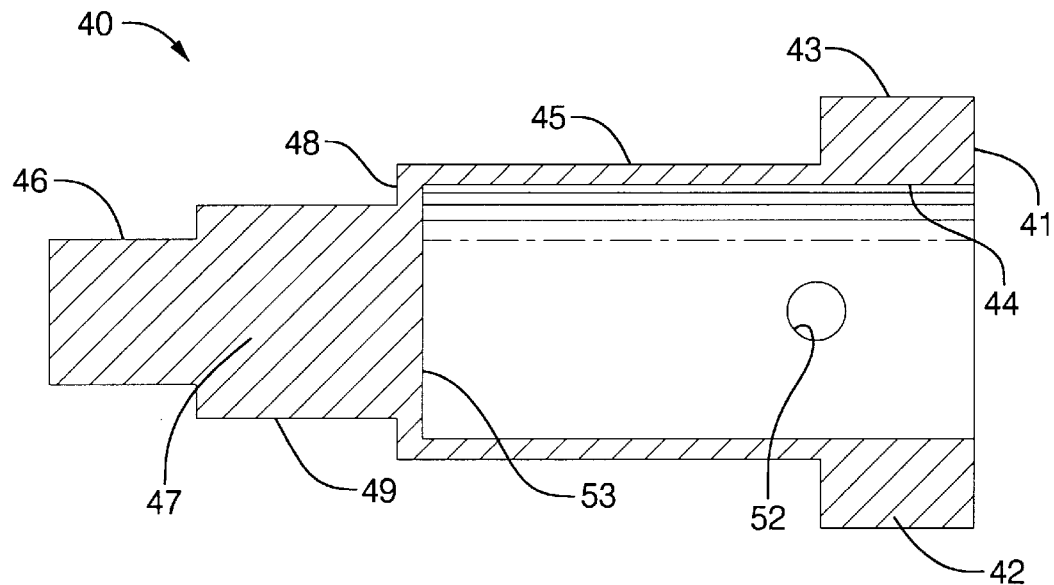
FIG. 2 is a separate axial cutaway view of an air valve output element used in the brake booster of FIG. 1.
Figure 3:
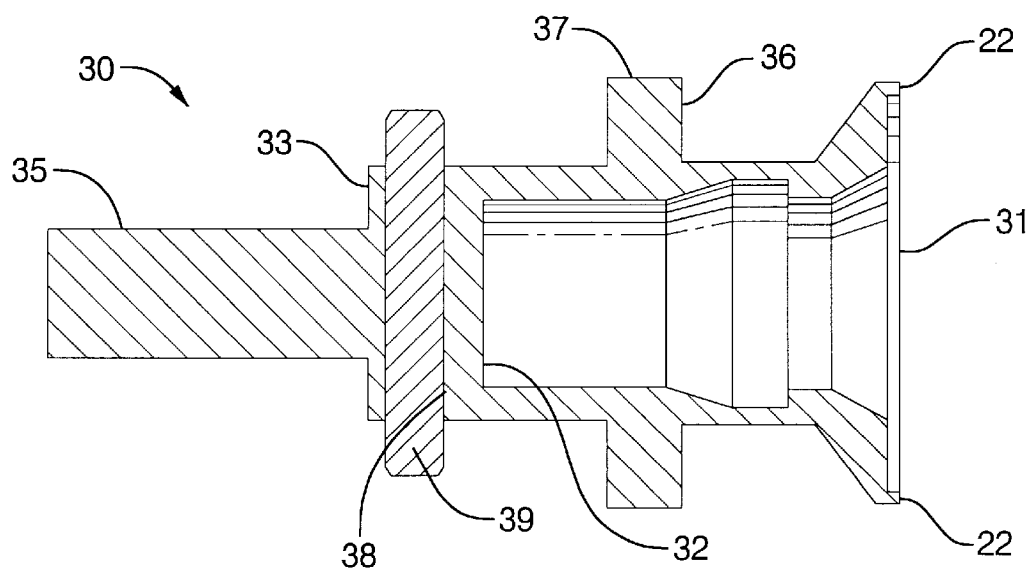
FIG. 3 is a separate axial cutaway view of an air valve input element used in the brake booster of FIG. 1.

Air valve 20 comprises two main parts: air valve input element 30, shown separately in FIG. 3, and air valve output element 40, shown separately in FIG. 2. Each of these parts may be made of a metal or plastic material. Air valve seat 22 is part of air valve input element 30, on which it defines an opening for a deeply concave receptacle 32 in an axial end 31 to the right in FIGS. 1 and 3. Receptacle 32 receives an input rod 50, which transfers input brake force from a brake pedal axially to air valve input element 30 in the normal manner. Air valve input element 30 also defines a shoulder 33 which forms a spring seat facing in the opposite direction from receptacle 32 and surrounds another axial end 35, which extends to the left in FIGS. 1 and 3 and has a reduced outer diameter compared with axial end 31. Between air valve seat 22 and shoulder 33 an annular flange 36 projects radially outward from axial end 31 of air valve input member 30. An outer cylindrical surface 37 of flange 36 provides a supporting surface for the input end of air valve 20 within power piston 14. A cylindrical opening 38 is drilled diametrically through axial end 31 between flange 36 and shoulder 33, and a cylindrical pin 39 is press fit into opening 38 to project radially outward therefrom on both ends for a purpose to be described below.

Air valve output element 40 is shown in FIG. 2. An axial end 41 comprises a radially extending flange 42 with an outer cylindrical supporting surface 43 and defines a deeply concave, extended axial opening 44 adapted to receive air valve input element 30 therein. Most of axial end 41 comprises a thin annular shell 45 that connects flange 42 to a solid portion 47 of smaller outer diameter and connected to shell 45 in an outwardly extending shoulder 48. Solid portion 47 has an outer cylindrical support surface 49 and defines another axial end 46. Air valve output element 40 further has a pair of diametrically opposed openings 52, only one of which is visible in the cutaway view, which are somewhat larger in the axial direction than the diameter of pin 39 in air valve input element 30 for a purpose to be described below.

To assemble air valve 20, a compression spring 54 is inserted over axial end 35 of air valve input member 30 (before pin 39 is press fit into opening 38) so that one axial end thereof abuts spring seat 33. Axial end 35 of air valve input element 30 with spring 54 is then inserted axially into opening 44 of air valve output element 40; and the other end of compression spring 54 abuts an inner axial surface 53, within concave opening 44, of solid portion 47. Air valve input element 30 is then pushed axially further into opening 44 against the force of compression spring 54 until opening 38 of air valve input element 30 appears completely within openings 52 of air valve output element 40; and pin 39 is then press fit into opening 38 so that it projects radially outward therefrom in both directions into the openings 52. Pin 39 is thereafter pressed by spring 54 against an axial side of each opening 52 and thus maintains a predetermined maximum axial length or air valve 20 and a predetermined compressive load in spring 54 of about 130 pounds. In this position, the axial distance "A", shown in FIG. 1, between axial end 35 of air valve input element 30 and surface 53 of air valve output element 40 is less than the axial distance "B" between flange 36 of air valve input element 30 and flange 41 of air valve output element 40. Thus, if air valve 20 is shortened axially by applying a large axial compressive force between elements 30 and 40 through input rod 50, the compressive shortening will be stopped before flanges 36 and 41 will axially engage. This is important, since thin annular shell 45 is not designed to support the large axial compressive forces that could result from such engagement.

The assembled air valve 20 is inserted into power piston 14 and is supported radially at its input end by the outer cylindrical support surfaces 37 and 43 of flanges 36 and 41, respectively, within an inner cylindrical support surface 58 of power piston 14. At its output end, cylindrical support surface 49 of air valve 20 is supported within an inner cylindrical support surface 60 on a support fitting 62 of power piston 14. Air valve 20 is thus able to move axially within power piston 14 as it is urged to the left, in FIG. 1, by input rod 50. A compression spring 64 is inserted between an axial spring seat on flange 41 and an opposing axial spring seat on a shoulder 70 of power piston 14 extending radially inward from support surface 60 thereof. Spring 64 is compressively loaded with a much smaller force (16–20 pounds) than compression spring 54 of air valve 20 and is effective to return air valve 20, in the absence of an input brake force, to a rest position slightly to the right of the poised position shown in FIG. 1. In the rest position, air valve seat 22 is closed against floating valve member 18 and has pushed the latter slightly away from vacuum valve seat 16 so that vacuum is present on both sides of the diaphragm and the booster is deactivated.

In operation, an input brake force on rod 50 will operate booster 10 in a normal manner, with air valve 20 acting as a single unit, as long as it does not exceed the force required to compress spring 64 from the poise position shown in FIG. 1 by the distance "C" (shown in FIG. 1) to the point where shoulder 48 of air valve output element 40 engages shoulder 70 of power piston 14. Once the force increases above this level, air valve output element 40 will not move further to the left, since this would require the vehicle operator to move power piston 14 directly by the brake pedal. Thus increasing force compresses spring 54 and thus moves air valve input element 30 further into air valve output element 40. The result is an axial shortening of air valve 20 and a resultant greater opening between air valve seat 22 and floating valve element 18, which is held back by power piston 14. Thus air will rush into the working chamber at a much faster rate and provide a faster increase in power assist force than would be accomplished by the standard arrangement.

What is claimed is:

1. In a brake booster comprising a constant pressure chamber, a working chamber, a floating control valve, a power piston with a vacuum valve seat engageable with the floating control valve for controlling the admittance of a working vacuum to the working chamber and an air valve engageable with the floating control valve for controlling the admittance of air at atmospheric pressure to the working chamber, the air valve comprising, in combination:

an air valve input element having a first axial end with an air valve seat for engaging the floating control valve and a receptacle for a brake input rod and a spring seat facing in a direction opposite the receptacle, the air valve seat element further having a reduced diameter second axial end projecting axially from the spring seat;

an air valve output element having an input axial end circumferentially surrounding the air valve seat element and output axial end, the air valve output element further having an outer cylindrical support surface adjacent the output axial end for engagement with an inner cylindrical support surface in the power piston, a radially outwardly extending shoulder adjacent the outer cylindrical support surface for engagement with a radially inwardly extending shoulder of the power piston adjacent the inner cylindrical support surface thereof and an outer spring seat facing the outwardly extending shoulder of the power piston;

a first spring in compression between the outer spring seat of the air valve output element and the radially outwardly extending shoulder of the power piston; and a second spring in compression between the spring seat of the air valve input element and the output axial end of the air valve output element, the second spring having a stronger spring constant than the first spring so as to create a low force mode of operation when the brake input force is insufficient to move the radially outwardly extending shoulder of the air valve output element against the first spring into engagement with the radially inwardly extending shoulder of the power piston and the air valve thus moves as a single unit to provide normal power assist and a high force mode of operation in which the brake input force is sufficient to move the radially outwardly extending shoulder of the air valve output element against the first spring into engagement with the radially inwardly extending shoulder of the power piston and thus permit movement of the air valve input element against the second spring to axially shorten the air valve and thus allow a greater air flow rate into the working chamber for faster application of brake assist force.

2. The brake booster of claim 1 in which the air valve input element has a pin directed radially outward therefrom and the air valve output element has an opening in a side wall of the air valve output element receiving the pin of the air valve seat for limited axial translation therein, the pin being engageable with a side of the opening to limit axial expansion of the air valve by the second spring and thus define normal air valve length.

3. In a brake booster comprising a constant pressure chamber, a working chamber, a floating control valve, a power piston with a vacuum valve seat engageable with the floating control valve for controlling the admittance of a working vacuum to the working chamber and an air valve engageable with the floating control valve for controlling the admittance of air at atmospheric pressure to the working chamber, the air valve comprising, in combination:

an air valve input element having a first axial end with an air valve seat for engaging the floating control valve and a receptacle for a brake input rod and a spring seat facing in a direction opposite the receptacle, the air valve input element further having a pin directed radially outward therefrom;

an air valve output element having an input axial end circumferentially surrounding the air valve seat element and output axial end, the air valve output element further having a radially outwardly extending shoulder for engagement with a radially inwardly extending shoulder of the power piston and an opening in a side wall of the air valve output element receiving the pin of the air valve seat for limited axial translation therein; and a spring in compression between the spring seat of the air valve input element and the output axial end of the air valve output element to force the pin of the air valve input element into engagement with a side of the opening in the side wall of the air valve output element to limit axial expansion of the air valve by the spring and thus define normal air valve length.

* * * * *